Patented June 20, 1933

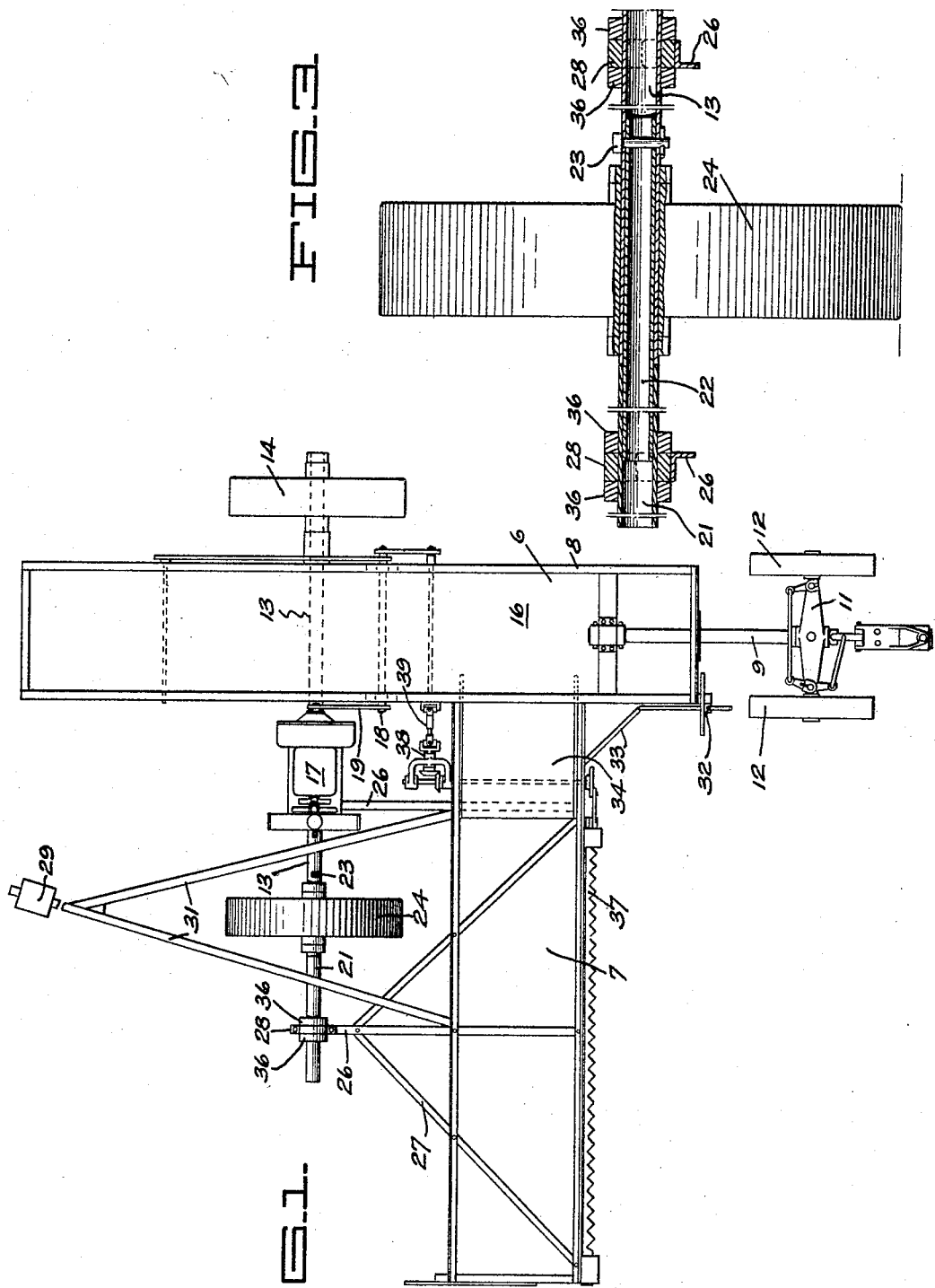

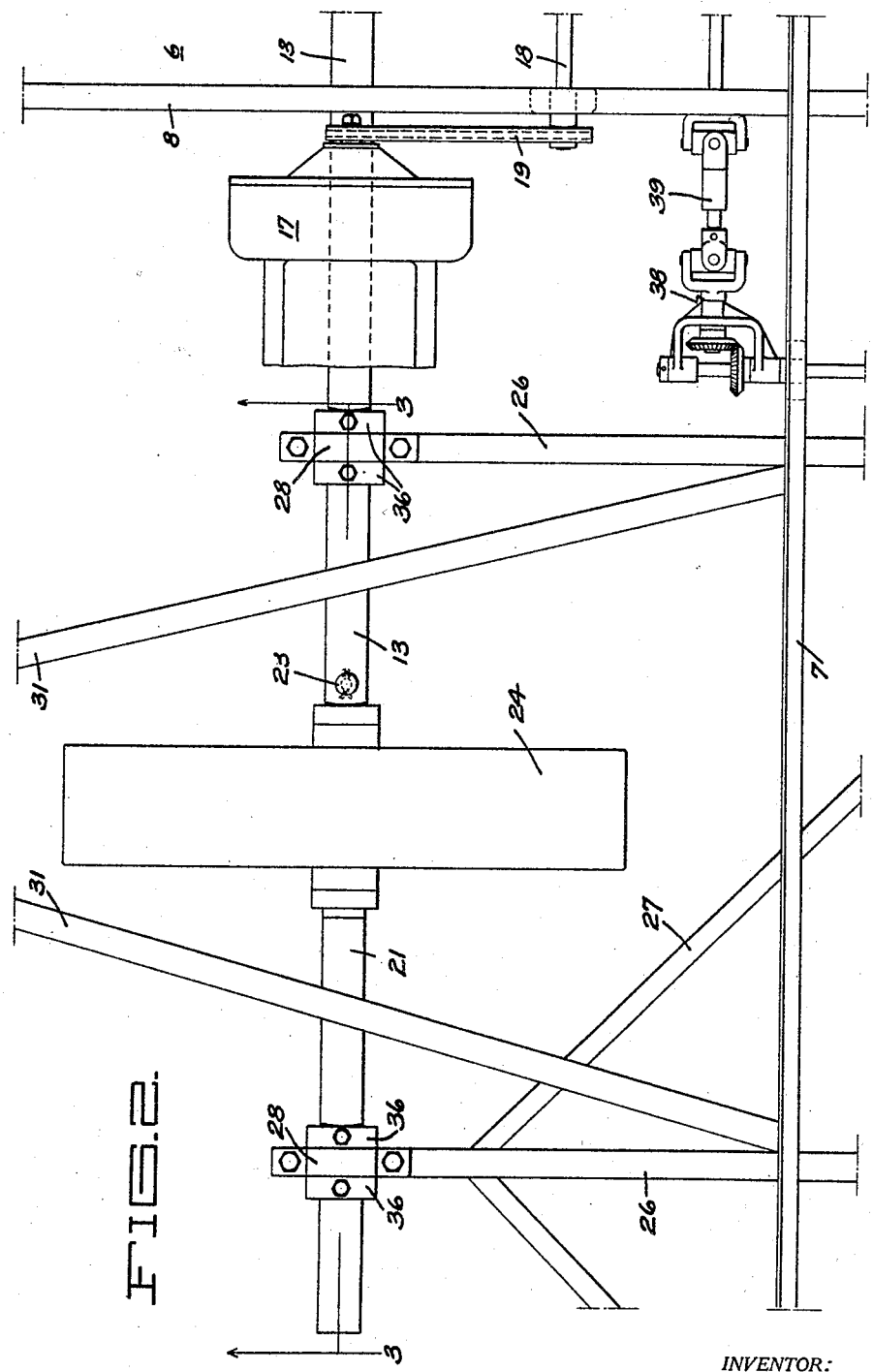

1,914,838

UNITED STATES PATENT OFFICE

LOWELL H. THOEN, OF STOCKTON, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

HARVESTER

Application filed November 2, 1927. Serial No. 230,457.

My invention relates to harvesting machinery and is particularly related to the header portion of a combined harvester-thresher. Such machines usually include two units, first a header, which cuts the standing grain, and passes it along to the second unit known as the separator in which the cut grain is threshed. It is customary to construct such machines with the header readily detachable from the separator in order to facilitate shipment as the combined unit is usually much too wide to be transported on ordinary roads or to be carried on ordinary railway cars. It is also the custom to have a long axle extending from the side of the separator and to mount the header mechanism on this axle so that it can rotate slightly about the axle to adjust the distance from the ground of the sickle or cutter part of the header. Such movement of the header mechanism about the axle and with respect to the separator causes a considerable vertical displacement between the end of the conveyor for the cut grain, called a draper, and the feeder house which is the portion of the separator receiving the cut grain. This difference in relative positions of the draper and the feeder house is usually taken care of by a hinged extension of the draper projecting into the feeder house. When the header is operating close to the ground, the draper extension is inclined to the horizontal and projects but a little into the feeder house while when the header is operated at a considerable height from the ground, the draper extension is more nearly horizontal and projects into the feeder house a material amount. It thus occurs that the grain discharged from the draper is not always placed at an advantageous location on the feeder in the feeder house.

It is therefore an object of my invention to provide means for adjusting the header so that the draper extension can always occupy the same relative position in the feeder house despite variations in height of the header.

Another object of my invention is to provide a supporting axle for the header which need not all be detached for shipment.

My invention possesses other advantageous features, some of which with the foregoing will be set forth at length in the following description where I shall outline in full that form of the adjustable header of my invention, which I have selected for illustration in the drawings accompanying and forming part of the present specification. In said drawings I have shown one form of adjustable header embodying my invention, but it is to be understood that I do not limit myself to such form since the invention, as set forth in the claims, may be embodied in a plurality of forms.

In the drawings:

Fig. 1 is a plan of a combined harvester-thresher with the adjustable header of my invention forming a part thereof.

Fig. 2 is an enlarged plan of a portion of the adjustable header of my invention.

Fig. 3 is a cross section on the line 3—3 of Fig. 2.

In its preferred form, the adjustable header of my invention ordinarily comprises a support, usually telescopic, extending from a carriage and adapted to carry a header framework thereon so that the header framework is rotatable on the support and is adjustably movable along the support.

As shown in the drawings, the combined harvester-thresher preferably includes a separator unit 6 and a header unit 7. The separator comprises a framework 8, conveniently constructed of channel and angle irons, which is supported at its front end on a tube 9 resting on an axle 11 bearing at its extremities on a pair of wheels 12. This front end construction is preferably similar to that disclosed in my Patent No. 1,822,178, issued September 8, 1931. Toward its rearward end, the framework 8 rests upon an axle 13, preferably tubular, at one end carrying a wheel 14 and at the other end extending a distance compatible with a reasonable shipping and transporting width for the separator.

The separator includes the usual threshing machinery and is provided in the region 16 with a feeder house for a feeder, as is customary. The threshing machinery is preferably driven by an engine 17 mounted on the projecting portion of the axle 13, as disclosed in my copending application, Serial Number 225,109, and connected to a drive shaft 18 for the machinery through a chain 19. The tubular axle 13 is generally extended by a tubular member 21, conveniently of the same diameter, firmly fastened to a sleeve 22 so that the sleeve is a unit with the member. The sleeve telescopes within the tubular axle 13 until the members 13 and 21 substantially abut, in which position the assembly is locked by a through pin 23. The effective operating length of the axle is the combined length of members 13 and 21. It can readily be shortened for transportation by demounting extension 21.

For supporting the extended portion of the axle I journal a wheel 24 on it and so locate the wheel that it revolves around the telescoped portions of the axle. This is for the reason that the axle tube is reenforced at this point and is well able to withstand the load imposed upon it. It is customary in header constructions to place a wheel at or near the extremity of the axle but I prefer to locate the wheel 24 as shown because it decreases the distance between the two supporting wheels and affords a more compact arrangement.

At each side of the wheel 24 is a beam 26 forming a part of the framework 27 of the header unit 7. Each beam 26 terminates in a split journal block 28 fitting around the tubular axle 13 or its extension 21 and permits the entire header 7 to rotate about the axle. The header is balanced by a weight 29 secured at the extremity of a balance beam structure 31 fastened to the framework 27 and extending rearwardly over the axle 13. The header is thus counter-balanced on the axle and very little force serves to raise or lower it. The raising and lowering of the header is accomplished by a Jacob staff 32 provided at a convenient point on the separator unit 6 and connected through the usual linkage 33 to the frame 27 of the header.

As the header unit is adjusted up and down, the draper extension 34, being hinged to the framework 27 and extending into the feeder house 16, projects into the feeder house varying amounts. Since it is desirable that the projection of the extension 34 be a fixed or approximately a fixed amount, I provide an adjustment permitting the entire header unit 7 to be moved along the axle 13 which is transversely of the direction of motion of the machine. At the sides of the journals 28 collars 36 are clamped and normally constrain the journals against motion in the direction of the axis of the axle although permitting free rotation between journal and axle.

If it happens that the header is relatively high and that the extension 34 projects too far into the feeder house 16, it is a simple matter to loosen the collars 36 and displace the entire header unit along the axle 13 until the projection of the extension into the feeder house is the correct amount. The collars can then be tightened on the axle to restrain the header unit against further transverse movement. A reverse adjustment can be made to move the extension 34 farther into the feeder house. Since the drive for the sickle bar 37 and for the draper is through the conventional tumbler shaft 38 which incorporates a slip joint 39 in its structure, rotary movement of the header unit about the axle or displacement of the header along the axle do not interfere with the driving connection.

I claim:

1. A header comprising a support including a pair of telescoping members, and a supporting wheel journaled on said support adjacent said telescoping portion.

2. An adjustable header comprising a carriage, a support on said carriage including a first tube and a second tube detachably connected to said first tube, a wheel journaled on said support, a pair of beams journaled on and movable along said support, means for restraining movement of said beams along said support, and header mechanism supported by said beams.

3. The combination with a separator unit having a feeder house, of an adjustable header comprising a header unit, a draper included in said header unit, and adapted to extend into said feeder house, means for adjusting said draper vertically whereby it extends varying amounts into said feeder house, and means for adjusting said draper horizontally to vary the amount said draper extends into said feeder house.

4. In a combined harvester thresher, a feeder house, a draper extension, means for moving said extension vertically accompanied by horizontal projection of said extension into said feeder house, and means for independently moving said extension horizontally.

5. The combination with a thresher, of a header, a support therefor, and connections between said header and said support to maintain said header in various operative positions at different distances from said thresher.

6. An adjustable header comprising a support, beams mounted for movement along said support, a header carried by said beams, and means for selectively securing said beams against said movement.

7. In a combined harvester-thresher, an axle, a header, and means including an adjustable connection to connect said header to said axle, said connection being adjustable to vary the point of connection to said axle.

8. In a header unit, a draper extension, a means for imparting to said extension a movement having a vertical and a horizontal component, and means for mounting said extension whereby said extension may be given an independent horizontal movement.

9. A support for a header comprising a first portion, a second portion of said support telescoping with said first portion so that said support is of variable length, and a header mounted on said support.

10. A support for a header comprising a tubular axle, a tubular member, a sleeve mounted on said member and telescoping with said axle, and means for securing said member and said axle together.

11. A support for a header comprising an axle, an extension member for said axle, means for joining said axle and said member in telescoped relationship to provide said support and a header mounted on said support.

12. A combined harvester-thresher machine having an axle, an extension attachable to said axle, a header, said extension serving to support said header for operation as a unit of said machine, to enable removal of said header unit, and to facilitate transportation of the machine.

13. In a combined harvester-thresher, a wheel, an axle passing through said wheel and having a portion extending beyond said wheel, a triangular frame, a header secured at the base of said frame, and a journal on said extended axle portion at the apex of said frame.

14. A harvester having an axle, a header, and connections between said axle and said header to enable said header to be angularly and axially adjusted with respect to the axis of said axle.

15. The combination with a threshing machine having a feeder and a supporting axle of a header having a frame and a spout hinged thereon and extending to said feeder, an extension on said axle maintained in axial alignment therewith, bearings for said frame, slidable on said axle and said extension, an adjustable connection between said header frame and said threshing machine to raise and lower said header, and adjustable collars on said axle and said extension adjacent said bearings to position said bearings to maintain the relation between said spout and said feeder unaltered for different positions of said header.

16. In a combined harvester-thresher machine, a main frame, mechanism mounted on said main frame adapted to receive cut grain and to remove the kernels therefrom, a ground support for said main frame including an axle, an auxiliary frame, a header mounted on said auxiliary frame, said auxiliary frame having an axle, means to connect said auxiliary frame to said main frame, and to connect said auxiliary frame axle to said main frame axle to position said header in position for operation with said mechanism on said main frame to enable said header to cut standing grain and feed the cut grain into said mechanism, said connecting means being readily removable to permit removal of said auxiliary frame and axle to facilitate transportation of the machine.

17. In a combined harvester-thresher machine, a main frame, mechanism mounted on said main frame adapted to receive cut grain and to remove the kernels therefrom, driving means for said mechanism, a ground support for said main frame including an axle, an auxiliary frame, a header mounted on said auxiliary frame, said header including a sickle and a draper, driving means for said sickle and draper, said auxiliary frame having an axle, means to connect said auxiliary frame to said main frame, to connect said mechanism driving means to said sickle and draper driving means, and to connect said auxiliary frame axle to said main frame axle to position said header in position for operation with said mechanism on said main frame to enable said header to cut standing grain and feed the cut grain into said mechanism, said connecting means being readily removable to permit removal of said auxiliary frame and axle to facilitate transportation of the machine.

18. A harvesting machine comprising, a main frame, a ground support for said main frame including an axle, a wheel on said axle, an auxiliary frame, a header on said auxiliary frame, a shaft adapted to be inserted within said wheel and axle and to extend outwardly therefrom, and a connection between said auxiliary frame and said shaft.

19. A harvesting machine comprising, a main frame, a ground support for said main frame including an axle, a wheel on said axle, an auxiliary frame, a header on said auxiliary frame, a shaft adapted to be inserted within said wheel and axle and to extend outwardly therefrom, a bearing for said auxiliary frame on said shaft, a second bearing for said auxiliary frame on said axle.

20. A harvesting machine comprising, a main frame, a ground support for said main frame including an axle, a wheel on said axle, an auxiliary frame, a header on said auxiliary frame, a shaft adapted to be inserted within said wheel and axle and to extend outwardly therefrom, a connection between said auxiliary frame and said shaft, and means adapted to be attached selectively to said shaft and axle to position said bearings in different locations on said shaft and axle.

21. The combination with a vehicle having a shaft mounted thereon, of a header having a frame, a second shaft, the ends of said shafts being arranged to form a telescopic connection, a wheel mounted on said telescopic connection, and bearings for said frame on said shafts on each side of said wheel.

22. The combination with a vehicle having a ground-engaging support comprising an axle with a wheel thereon, of a header, and means to connect said header to said vehicle so that said header can be adjusted with respect to said axle, comprising a member adapted to be attached to said axle to project outwardly from said wheel, and a connection from said header to said member permitting movement of said header relatively thereto.

In testimony whereof, I have hereunto set my hand.

LOWELL H. THOEN.